United States Patent [19]
Schwerin et al.

[11] 3,912,334

[45] Oct. 14, 1975

[54] HYDRAULIC BRAKING ARRANGEMENT FOR TOWING VEHICLE WITH TRAILER

[75] Inventors: Gunter Schwerin, Moglingen; Werner Reitz, Stuttgart, both of Germany

[73] Assignee: Robert Bosch G.m.b.H., Stuttgart, Germany

[22] Filed: Jan. 23, 1975

[21] Appl. No.: 543,333

[30] Foreign Application Priority Data
Jan. 31, 1974 Germany............................ 2404519

[52] U.S. Cl................ 303/7; 188/3 R; 200/82 R
[51] Int. Cl.²........................................ B60T 13/00
[58] Field of Search................ 303/7, 10, 13, 15, 2; 188/3; 200/81 R, 82 R, 82 D

[56] References Cited
UNITED STATES PATENTS

| | | |
|---|---|---|
| 3,582,150 | 6/1971 | Williams et al................. 303/13 X |
| 3,695,731 | 10/1972 | England et al.......................... 303/7 |
| 3,718,373 | 2/1973 | Hofer...................................... 303/7 |
| 3,790,807 | 2/1974 | Rossigno................................ 303/7 |
| 3,836,205 | 9/1974 | Schwerin........................ 188/3 R X |
| 3,869,177 | 3/1975 | Urban et al......................... 303/7 X |

Primary Examiner—Trygve M. Blix
Assistant Examiner—Douglas C. Butler
Attorney, Agent, or Firm—Michael S. Striker

[57] ABSTRACT

A hydraulic braking arrangement for a towing vehicle and a trailer connected thereto in which a pump carried by the towing vehicle is connected by a conduit, including a fluid coupling between the towing vehicle and the trailer, to a braking cylinder on the trailer, and in which the fluid pressure in the braking cylinder on the trailer is influenced by the force used for braking the towing vehicle. The trailer carries further a hydraulic accumulator and a solenoid valve operable to connect the braking cylinder on the trailer either to the conduit downstream of the fluid coupling or to the hydraulic accumulator.

23 Claims, 3 Drawing Figures

HYDRAULIC BRAKING ARRANGEMENT FOR TOWING VEHICLE WITH TRAILER

BACKGROUND OF THE INVENTION

The present invention relates to a hydraulic braking arrangement for a towing vehicle with a trailer, in which a hydraulic pump on the towing vehicle supplies pressure fluid to a consumer device, for instance a hydraulic operated lifting device, on the trailer and over a brake valve to a brake cylinder on the trailer, and in which the fluid pressure in the brake cylinder on the trailor is influenced by the force used for braking the towing vehicle. The conduit which connects the pump on the towing vehicle with a brake cylinder on the trailer is further divided by a fluid coupling between the towing vehicle and the trailer in a first section connected to the towing vehicle and a second section connected to the trailer.

The braking pressure produced in the main brake cylinder on the towing vehicle serves in a known braking arrangement of the aforementioned kind to control a pilot valve on the towing vehicle so that a major portion of the fluid pressure stream produced by the pump is furnished to a consumer device on the towing vehicle, for instance to a lifting device mounted thereon. In this known arrangement safety devices are missing which permit braking of the trailer during breakdown of elements of the braking arrangement on the towing vehicle. Thus, for instance, after a breakdown of the pump, the main brake cylinder on the towing vehicle or the pilot valve thereon, or after separation of the towing vehicle from the trailer, a proper braking of the trailer is not possible any longer. Also during disconnecting of the trailer from the towing vehicle no possibility exists to brake the trailer with the braking arrangement mounted in part on the towing vehicle, which is especially of disadvantage when the towing vehicle and the trailer are located on an inclined surface during disconnection of the trailer from the towing vehicle.

SUMMARY OF THE INVENTION

It is an object of the present invention to provide a hydraulic braking arrangement of the above-mentioned type which avoids the disadvantages of the known braking arrangement described above.

It is a further object of the present invention to provide a braking arrangement of the aforementioned kind which is provided with a safety device assuring that a proper braking of the trailer can be carried out under all operating conditions and especially during breakdown of some of the essential elements of the braking arrangement carried by the towing vehicle.

It is an additional object of the present invention to provide for such an arrangement which is composed of a minimum of additional parts so that the braking arrangement may be manufactured at reasonable cost and may operate trouble-free after extended use.

With these and other objects in view, which will become apparent as the description proceeds, the hydraulic braking arrangement according to the present invention for a towing vehicle with a trailer mainly comprises an operator controlled main brake cylinder on the towing vehicle, a second brake cylinder on the trailer, a hydraulic pump on the towing vehicle, conduit means connecting this pump with the second brake cylinder, a brake valve on the towing vehicle arranged in said conduit means and constructed so that the fluid pressure exerted on the second brake cylinder is influenced in dependence on the pressure exerted by the operator on the main brake cylinder, a fluid coupling in the aforementioned conduit means dividing the latter in a first section connected to the towing vehicle and a second section connected to the trailer, a hydraulic accumulator on the trailer, fluid passage means connecting the hydraulic accumulator with the second section of the conduit means, a one-way valve in the fluid passage means permitting flow of fluid from the second section into the hydraulic accumulator while preventing flow of fluid in the opposite direction, a solenoid valve in the passage means including a magnet and a control member cooperating with the magnet for controlling flow of fluid between the fluid coupling and the second brake cylinder and between the latter and the hydraulic accumulator, an electric circuit including a current supply on the towing vehicle, an electric connector connecting this circuit with the magnet of the solenoid valve, and at least one switch means on the towing vehicle for opening and closing the electric circuit.

In this way the hydraulic braking arrangement according to the present invention is provided with a safety arrangement of simple construction which assures a proper braking of the trailer if the latter is disconnected for any reason whatsoever from the towing vehicle. Furthermore, the braking arrangement according to the present invention can be simply adapted to an existing braking arrangement.

An especially advantageous construction is derived when the control member of the solenoid valve is provided with biasing means for biasing the control member, when the magnet is deenergized, to a rest position in which the brake cylinder on the trailer is connected to the hydraulic accumulator, and in which the magnet, when energized, moves the control member against the force of the biasing means to a working position in which flow of fluid between the hydraulic accumulator and the brake cylinder on the trailer is prevented and this brake cylinder is connected to the fluid coupling to receive pressure fluid from the pump on the towing vehicle. In this way the solenoid valve may be of simple construction and will assure that during disconnection of current supply to the solenoid valve, the trailer will always be properly braked.

It is further advantageous to arrange a fluid stream limiting valve in the fluid passage means and to connect the limiting valve in series to the above-mentioned one-way valve and in parallel to the control member. This will prevent a delayed build-up of the pressure in the brake cylinder on the trailer during braking of the latter since only a small constant partial stream will be branched off the supply the hydraulic accumulator with pressure fluid.

It is also advantageous to arrange in the electric circuit a second switch which is constructed and arranged to be controlled dependent on the braking pressure acting on the brake cylinder on the trailer and this second switch is preferably constructed as a hydraulically operated differential pressure switch operated by the difference of the braking pressure prevailing in the second section of the conduit means and the pressure exerted by the operator on the main brake cylinder. It is also advantageous to provide the aforementioned second switch with a time-delay element assuring that during normal increase of the braking pressure in the cylinder on the trailer the solenoid valve will not carry out any unnecessary switching operation so that energy losses may be avoided.

It is further advantageous to provide a second hydraulic accumulator on the trailer connected to the brake cylinder thereon and in which flow of fluid from the first-mentioned hydraulic accumulator as well as from the second hydraulic accumulator to the brake cylinder on the trailer may be interrupted by appropriate valves in the fluid passage means between the accumulators and the brake cylinder on the trailer. In this way it is possible when the trailer is disconnected from the towing vehicle to prevent braking of the trailer by fluid pressure from the hydraulic accumulators, which is for instance necessary if the trailer, while being disconnected from the towing vehicle, should be moved.

The solenoid valve is preferably provided with two valve elements cooperating with corresponding valve seats in a common bore of the solenoid valve. The solenoid valve is thereby a three-way two-position valve which is of a special importance for the present invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
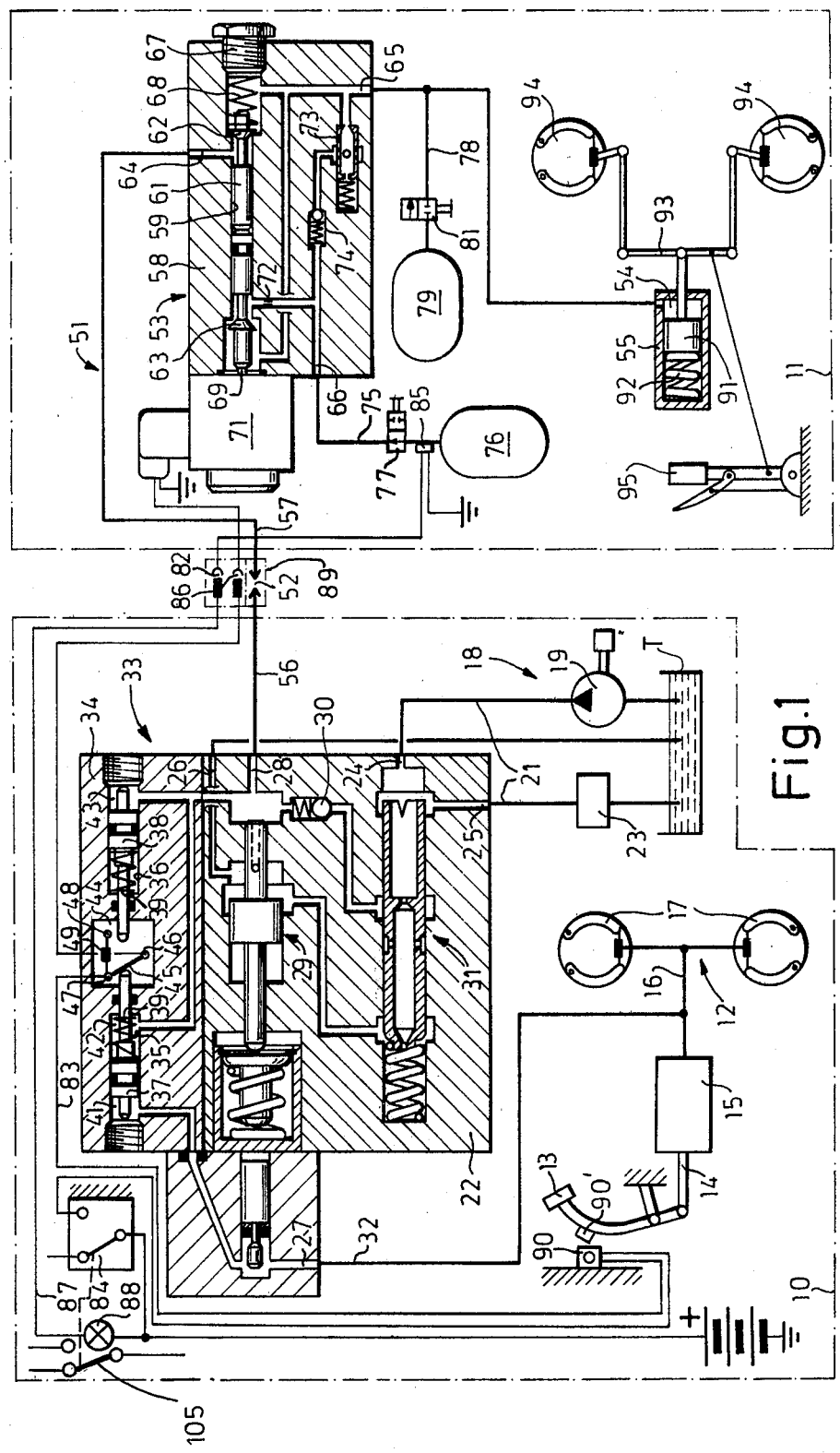
FIG. 1 illustrates, partially in a schematic manner, a hydraulic braking arrangement for a towing vehicle with a trailer.

FIG. 1 illustrates a braking arrangement for a towing vehicle 10 with a trailer 11. The towing vehicle 10 is provided with a hydraulic braking arrangement 12 which comprises a brake pedal 13, aa brake linkage 14 connected thereto, a main brake cylinder 15, and a brake conduit 16 connecting the cylinder 15 with the brakes 17 on the towing vehicle. The towing vehicle 10 is further provided with a hydraulic system 18 which includes a pump 19 which supplies, over conduits 21 and a brake valve 22, a consumer device downstream of the valve 22, for instance a hydraulically operated lifting device, with pressure fluid.

The valve 22 is of known construction, as for instance described in the German Pat. No. 2,055,801 or in the U.S. Pat. No. 3 718 373. As shown, the valve 22 has an inlet port 24 connected to the pump 19, a consumer port 25 connected to the device 23, a return port 26 leading to a tank T from which the pump 19 pumps pressure fluid, a control port 27 and a brake port 28. The valve 22 further includes a main valve 31 controlled by a servo valve 29 and is hydraulically operated from the pressure in the main brake cylinder 15 by a control conduit 32 between the conduit 16 and the control port 27. Thus, the valve 22 adjusts in a known manner the fluid pressure in the brake port 28 and therewith the trailer brake pressure proportional to the pressure created in the main cylinder 15 by the operator, while the pressure medium from the pump 19 is transmitted to the downstream arranged consumer device 23.

An electro-hydraulic differential pressure switch 33 is mounted on the valve 22. The differential pressure switch 33 comprises a housing 34 formed with two oppositely arranged bores 35 and 36 in which a first control piston 37, respectively a second control piston 38, are arranged. Both control pistons 37 and 38 are respectively held by springs 39 in a first position abutting against screw plugs closing the aforementioned bores at the outer ends thereof. The first control piston 37 defines in its bore a first pressure compartment 41, which is connected with the control conduit 32 and the control port 27 through a passage as shown in FIG. 1, as well as a second pressure compartment 42 which is connected by a passage with the brake port 28 and also with a first pressure compartment 43 defined in the bore 36 by the second control piston 38. A contact lever 45 arranged in a compartment 44 of the switch 33 between the bores 35 and 36 is turnable about a pivot 46 and abuts in the position shown in FIG. 1 against one end of an axially projecting rod connected to the control piston 37 and on a first electrical contact 47.

Between the first contact 47 and a second contact 48, against which the lever 45 abuts in the open position of the switch, there is arranged in the compartment 44 a time-delay element 49 adapted to interrupt the electrical circuit after a predetermined time when the lever is moved from the contact 47 to the contact 48.

Conduit means 51 lead from the brake port 28 of the valve 22 over a fluid coupling 52 to a solenoid valve 53 on the trailer 11 to the pressure compartment 54 of a brake cylinder 55 on the trailer 11. A hydraulic coupling 52 divides the conduit means 51 into a first section 56 connected to the towing vehicle 10 and a second section 57 connected to the trailer 11.

The solenoid valve 53, connected to the second section 57 of the conduit means, comprises a housing 58 provided with an axial bore 59 having bore portions of increased diameter at opposite ends thereof. A control member 61 is mounted in the bore 51 and the control member 61 comprises two valve elements 62 and 63 abutting against each other and cooperating with valve seats formed at the junction of the central portion of the bore 59 and the end portions thereof of increased diameter. The valve element 62 controls flow of fluid from the inlet port 64 of the solenoid valve 53, to which the second section 57 of the conduit means is connected, to the brake port 65 of the solenoid valve, whereas the second valve element 63 controls flow of fluid between the port 65 and a port 66 to which a first hydraulic accumulator 76 on the trailer is connected by a conduit 75. A spring 68 abutting with one end against a screw plug 67 closing the right end, as viewed in FIG. 1, of the enlarged portion of the bore 59 presses the first valve element 62, when the magnet 71 of the solenoid valve is deenergized, onto its seat, whereby the second valve element 63 abuts against the first valve element 62 and against a plunger 69 movable by the magnet 71. The second valve element 63 is thereby held in open position permitting flow of pressure fluid past its valve seat. A throttle 72 is arranged upstream of the valve seat of the second valve element 63 in the passage leading from the hydraulic accumulator port 66 to the brake port 65. A fluid stream limiting valve 73 and a one-way valve 74 are arranged in a passage formed in the housing 58 and leading from the port 66 to the port 65. These two valves are arranged in parallel to the passage controlled by the second valve element 63 and leading to the brake port 65, and the one-way valve 74 is arranged to prevent direct flow from the port 66 to the port 65 while permitting flow of fluid in the opposite direction, and the fluid stream in the opposite direction is limited by the valve 73.

A two-way valve 77 is arranged in the conduit 75 and permits, respectively prevents, flow of pressure fluid through this conduit to and from the first hydraulic accumulator 76. A conduit 78 leads from the brake port 65 to a second smaller hydraulic accumulator 79 and flow of fluid through the conduit 78 may be stopped by a two-way valve 81 arranged therein.

The magnet 71 of the solenoid valve 53 is connected through an electrical connector 86 with a first electrical circuit 83 provided on the towing vehicle 10, and the above-mentioned differential pressure switch 33 as well as a switch 84 coupled to an ignition switch 105 on the towing vehicle are arranged in the circuit 83 in series with each other. An electro-hydraulic pressure switch 85 coordinated with the first hydraulic accumulator 76 is connected over a second electric connector 82 with a second electrical circuit 87 on the towing vehicle 10 in which a control lamp 88 is arranged. A third switch 90 is arranged in the first electrical circuit 83 in series to the switch 84, and a third switch 90 is operated by an operating element 90' arranged on the brake pedal 13. The switch 90 interrupts the first electrical circuit 83 when the brake pedal 13 carries out, for some reason whatsoever, for instance when the main cylinder 15 is defective, an unduly large stroke.

The electrical connectors 82 and 86 and the hydraulic coupling 52 are preferably arranged in a common housing 89. This housing 89 may be arranged adjacent a mechanical coupling, not shown, which normally connects the towing vehicle 10 with the trailer 11.

A piston 91 is reciprocably arranged in the brake cylinder 55 on the trailer 11, and the piston 91 is biased by a spring 92 abutting against the piston 91 on the side thereof opposite from the pressure compartment 54. The piston 91 is connected by a brake linkage 93 with the brakes 94 on the trailer. Manually operated brake means 95 mounted on the trailer 11 are also connected to the brake linkage 93.

The above-described braking arrangement will operate as follows:

It is assumed that the braking arrangement on the towing vehicle 10 is not operated, that the switch 84 coupled to the ignition switch 105 is in the shown position in which the first circuit 83 is interrupted, and that the trailer is connected to the towing vehicle 10. It is further assumed that the first hydraulic accumulator 76 is fully loaded. The magnet 71 of the solenoid valve 53 is therefore deenergized and the spring 68 pushes the control member 61 to the shown position, in which the first valve element 62 interrupts flow of fluid between the port 64 and the brake port 65, whereas the second valve element 63 opens the passage between the accumulator port 66 and the brake port 65. In this way fluid pressure from the first hydraulic accumulator 76 will be transmitted over the normally open valve 77 and the solenoid valve 53 to the pressure compartment 54 of the brake cylinder 55 on the trailer and the latter will thereby be braked.

If now the ignition switch 105 is actuated, the switch 84 will be moved to the closed position and the electric circuit 83 is energized. The electro-hydraulic differential pressure switch 33 will be in the illustrated closed position so that the magnet 71 will be energized to move thereby by means of its plunger 69 the control member 61 against the force of the spring 68 towards the right, as viewed in FIG. 1. Thereby, the second valve element 63 will be moved to engage its valve seat so that the first hydraulic accumulator 76 will be separated from the conduit means 51 by the valve element 63 and the one-way valve 74. At the same time the first valve element 62 becomes disengaged from its valve seat so that the pressure in the brake cylinder 55 on the trailer will be released through the solenoid valve 53, the conduit 51, the fluid coupling 52, and the valve 22 to the return port 26 connected to the tank T. The spring 92 in the brake cylinder 55 will assure thereby a proper loosening of the brakes 94 on the trailer. If the manually operated brake 95 on the trailer as well as the non-illustrated corresponding manually operated brake on the towing vehicle are now released, the towing vehicle 10 and the trailer 11 are ready for travel. During operation of the motor (not shown) of the towing vehicle 10 and operation of the pump 19 thereby, the pump will circulate braking fluid substantially without pressure loss through the conduits 21 as well as through the non-actuated valve 22 and the disconnected consumer device 23.

If now for any reason whatsoever, the trailer 11 is separated by force from the towing vehicle 10, when the trailer 11 is travelling or at standstill, then the fluid coupling 52 and the electrical connectors 82 and 86 will be separated. Thereby, the electrical circuit 83 to the magnet 71 is interrupted and the spring 68 presses the control member 61 to the position shown in FIG. 1. In this position, pressure fluid can flow from the first hydraulic accumulator 76 through the solenoid valve 53 to the pressure compartment 54 of the brake cylinder 55 to thereby move the brakes 94 on the trailer to a braking position. To prevent sudden operation of the brakes 94, the pressure built up in the pressure compartment 54 is advantageously slowed down by the throttle 72.

During operation of the hydraulic braking arrangement 12 on the towing vehicle 10 by the operator acting on the brake pedal 13, the thus-obtained braking pressure is transmitted by the control conduit 32 to the control port 27 of the brake valve 22. Proportional to this control pressure, the brake valve 22 will regulate, in a known manner, the fluid pressure in the brake port 28. In order to raise the fluid pressure in the brake port 28, the precontrolled main valve 31 throttles the fluid stream from the pump 19 and directs a constant fluid stream to the brake port 28. This fluid pressure at the brake port 28 will be maintained since, on the one hand the main valve 31, respectively the one-way valve 30, and on the other hand the servo valve 29 itself may interrupt flow of fluid to the port 28. The lowering of this pressure is controlled by the servo valve 29.

If now an essential element of the braking arrangement carried by the towing vehicle 10, for instance the pump 19 or the brake valve 22, becomes inoperative during the braking operation, no pressure can build up in the brake port 28 of the valve 22 so that the pressure compartments 42 and 43 of the differential pressure switch 33 remain without fluid pressure. The control pressure in the first compartment 41 of the switch 33, however, pushes the first control piston 37 against the force of the spring 39 from the position shown in FIG. 1 towards the right, as viewed in FIG. 1, to a second position to thereby turn the switch lever 45 in clockwise direction so that the latter abuts with its outer end the second contact 48 and thereby interrupts the first electrical circuit 83. Due to the time delay element 49, this interruption of the circuit will be slightly delayed, whereafter the solenoid valve 58 will be deenergized to thereby start the safety braking of the trailer 11. Thereby it is of special importance that the switch lever 45 can be returned from its open position to the closed position, as illustrated in FIG. 1, only by the second control piston 38. This requires that before the brakes 94 on the trailer 11 may be released, the damage in the braking arrangement must first be repaired in order that a build-up of pressure in the brake port 28 can be obtained. The differential pressure switch 33 has also the important advantage that the safety braking of the trailer will be maintained even if the operator of the towing vehicle releases the brake pedal 13 and thereby reduces the control pressure in the first pressure compartment 41.

When the above-mentioned damage is repaired and a build-up of fluid pressure in the brake port 28 is possible, such pressure will act also on the control pistons 37 and 38. The first control piston 37 has in the second pressure compartment 42 a smaller acting surface than that in the first pressure compartment 41. These two acting surfaces are proportioned with respect to each other to assure that the fluid pressure in the pressure compartment 42 moves the first control piston 37 against the control pressure in the first pressure compartment 41 into the position as illustrated in FIG. 1. The second control piston 38 moves then under the influence of the pressure prevailing in the pressure compartment 43 the switch lever 45 to its closed position, as shown in FIG. 1. The electric circuit 83 is thereby reclosed, the solenoid valve 53 is energized and the safety braking on the trailer 11 is thereby released.

During braking of the towing vehicle 10 and the trailer 11, the control pressure in the control port 27 is built up faster than the fluid pressure in the brake port 28. In order to prevent that the first control piston 37 interrupts by means of the switch lever 45 the first electric circuit 83 to thereby initiate the safety braking of the trailer 11, before the pressure in the brake port 28 builds up sufficiently to move the switch lever 45 again to its closed position, the time delay element 49 is connected between the contacts 47 and 48 so that the current is interrupted only after a certain time delay. In this extremely simple manner unnecessary switching operations are avoided and hydraulic as well as electric energy is saved. The time-delay element 49 may be easily adjusted to the delay of the pressure build-up in the port 28 and in addition the delay produced by the element 49 is so short that it will not have any detrimental influence on the proper operation of the safety braking of the trailer 11.

When the solenoid valve 53 is energized, the valve elements 62 and 63 are moved from the position shown in FIG. 1 towards the right, so that the fluid pressure prevailing in the brake port 28 of the valve 22 will be transmitted through the conduit means 51, the solenoid valve 53 to the compartment 54 of the brake cylinder 55 on the trailer 11. When during normal braking the fluid pressure at the port 28 is greater than the operating pressure in the hydraulic accumulator 76, pressure fluid will flow over the limiting valve 73 and the one-way valve 74 to the hydraulic accumulator 76 to charge the latter. Such a constant stream will only be a fraction, for instance one-tenth, of the fluid stream necessary to operate the braking cylinder 55. The fluid stream limiting valve 73 is therefore of special importance since it will prevent that during fast braking of the trailer 11 too much of the braking fluid will be branched off to load the hydraulic accumulator 76, which could delay build-up of the necessary pressure in the brake cylinder 55. The prompt actuation of the braking cylinder 55 is therefore considerably improved. In addition, the braking arrangement may be dimensioned for a smaller flow of operating fluid. The first hydraulic accumulator 76 is dimensioned large enough so that a plurality of safety brakings may be carried out. If the pressure in the hydraulic accumulator 76 drops below a predetermined minimum pressure, the electro-hydraulic pressure switch 85 closes the second electric circuit 87 to thereby actuate the control lamp 88 in the second circuit 87, preferably mounted on the armature panel of the towing vehicle 10. This will induce the operator of the towing vehicle to initiate an accumulator loading braking until the hydraulic accumulator is again fully charged. Its maximum operating pressure is equal to the maximum permissible pressure for the braking arrangement on the trailer 11.

The above-described braking arrangement will also assure avoidance of accidents, especially of movement of the trailer 11 toward the towing vehicle 10 if the two vehicles should be located on an inclined surface and the manually actuatable brake 95 of the trailer should not be properly functioning.

During decoupling of the trailer from the towing vehicle, the non-illustrated manually operated brake of the towing vehicle 10 will first be actuated and subsequently thereto the motor of the towing vehicle 10 will be turned off. Subsequent to the operation of the manually operable brake 95 on the trailer, the fluid coupling 52 and the two electrical connectors 82 and 86 are separated and thereafter the two vehicles 10 and 11 are disconnected from each other. Already when the ignition switch 105 for the motor of the towing vehicle is turned off, the switch 84 coupled to the ignition switch 105 is opened, and the electric circuit 83 is interrupted so that the solenoid valve 53 is deenergized and the control member 61 of the solenoid valve 51 will be moved to the position shown in FIG. 1 so that pressure fluid from the hydraulic accumulator 76 will be transmitted to the pressure compartment 54 of the brake cylinder 55 and thereby the safety braking of the trailer 11 will be initiated. If it is overlooked to turn off the ignition switch 105, the safety braking of the trailer will take place latest during opening of the fluid coupling 52 and the electrical connectors 82 and 86. After decoupling of the trailer 11 from the towing vehicle 10, the trailer may still manually be moved. For this purpose, the easily accessible two-position valve 77 is closed and the second normally closed two-position valve 81 is opened so that the first hydraulic accumulator 76 is disconnected from the pressure compartment 54 of the brake cylinder 55 whereas the second hydraulic accumulator 79 is connected thereto. The second hydraulic accumulator 79 has an operating pressure which corresponds substantially to the force produced by the spring 92 on the piston 91. The fluid in the compartment 54 which is under braking pressure can thereby flow from the compartment through the conduit connected to the inlet port of the compartment 54, the conduit 78 and the opened valve 81 into the second hydraulic accumulator 79. The trailer 11 can subsequently thereto be moved with slightly applied brakes. After the valve 81 is closed and the valve 77 is opened, the trailer 11 will be again fully braked. After a manual movement of the trailer 11 it is necessary, when the trailer 11 is again connected to the towing vehicle 10, to reduce the fluid pressure in the second hydraulic accumulator 79 by means of the two-way valve 81.

During connection of the trailer 11 to the towing vehicle 10, it is advantageous, for safety reasons, to shut off the motor of the towing vehicle 10. Subsequently thereto the hydraulic coupling 52 and the two electrical connectors 82 and 86 are connected so that the trailer 11 remains braked, until start of travel, by means of the first hydraulic accumulator 76.

Starting and stopping of the towing vehicle with the trailer connected thereto on an inclined mountain road can also be safely carried out with the braking arrangement as above described. During stopping on the mountain road the trailer 11 is, when the motor on the towing vehicle is in operation and the braking arrangement 12 on the towing vehicle is actuated by the operator, hydraulically braked. When the motor of the towing vehicle 10 is stopped, the trailer 11 is properly braked by means of the hydraulic accumulator 76 and can be additionally braked by the manually operable brake 95.

During start of operation of the vehicles on an inclined mountain road, the manually operable brake 95 will first be released while the trailer by means of the hydraulic accumulator 76 will remain braked. Subsequently thereto the braking device 12 on the towing vehicle 10 will be actuated and then the non-illustrated manually operable brake on the towing vehicle 10 will also be released. If the motor on the towing vehicle 10 will now be actuated, then the safety brake arrangement on the trailer 11 will be replaced by the operator controlled braking operation building up fluid pressure in the brake port 28 of the valve 22 which is transmitted in the manner as described before to the pressure compartment 54 of the brake cylinder 55 on the trailer 11.

Figure 2:
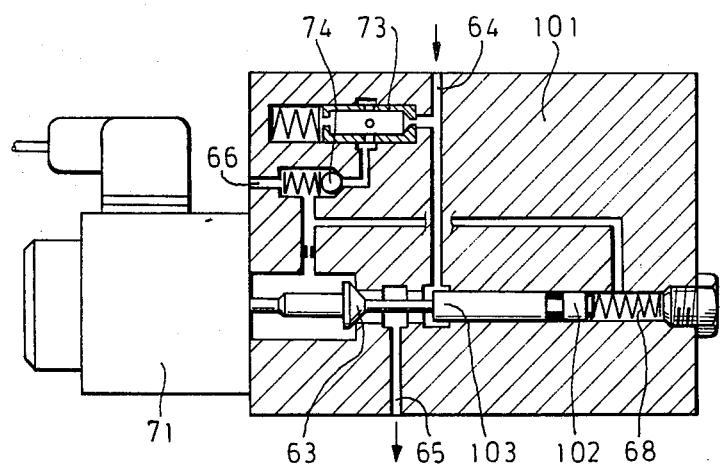
FIG. 2 illustrates a second embodiment for a solenoid valve for the braking arrangement according to FIG. 1.

FIG. 2 illustrates a second embodiment of a solenoid valve 101, which differs from the solenoid valve 53 shown in FIG. 1 mainly by a simplified control member 102. Elements of the solenoid valve 101 shown in FIG. 2 which are constructed substantially in the same manner as corresponding elements shown in FIG. 1 are designated in FIG. 2 with the same reference numeral. The control member 102 of the solenoid valve 101 has a valve element 63, preferably of conical configuration, cooperating with a valve seat formed in the bore in which the control member 102 is arranged, and a cylindrical piston portion 103 which controls flow of fluid from the inlet port 64 of the solenoid valve to the brake port 65 of the latter. The fluid stream limiting valve 73 and the one-way valve 74 are in this arrangement connected between the port 64 and the brake port 66. The solenoid valve 101 shown in FIG. 2 is considerably simpler than that shown in FIG. 1, however, it has the disadvantage that a greater amount of fluid may leak past the cylindrical portion 103 when the latter is moved from the position shown in FIG. 2 towards the left and in which it substantially prevents flow of fluid from the inlet port 64 to the brake port 65. This can be especially of disadvantage when the safety braking by means of the hydraulic accumulator 76 is maintained for a considerable time.

Figure 3:
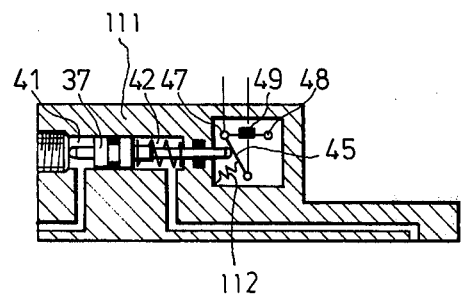
FIG. 3 illustrates a second embodiment for an electro-hydraulic differential pressure switch for the brake arrangement of FIG. 1.

FIG. 3 illustrates a second embodiment of an electric hydraulic differential pressure switch 111 which differs from the embodiment of the switch shown in FIG. 1 mainly by a spring 112 connected to the switch lever 45 and biasing the latter to the position shown in FIG. 3. The spring 112 therefore substantially takes over the function of the second control pistons 38 shown in the arrangement of FIG. 1. Elements of the switch 111 shown in FIG. 3 which are the same as the elements of the switch 33 shown in FIG. 1 are designated in FIG. 3 with the same reference numeral as in FIG. 1. The spring 112 biases the switch lever 45 in contradistinction to the control piston 38 of FIG. 1 continuously to the position shown in FIG. 3 in which it abuts against the end of the rod projecting coaxially from the control piston 37. The differential pressure switch 111 shown in FIG. 3 is considerably simpler than that shown in FIG. 1, its functional difference is that the safety braking of the trailer 11 will be maintained only as long as the brake 12 of the towing vehicle is operated. If the control pressure in the first pressure compartment 41 of the switch 111 is missing, the spring 112 will move the switch lever 45 to the closed position, thereby energizing the magnet 71 of the solenoid valve 53 to move the control member 61 of the latter to a position towards the right from the position shown in FIG. 1.

It will be understood that each of the elements described above, or two or more together, may also find a useful application in other types of hydraulic braking arrangements for a towing vehicle with a trailer differing from the types described above.

While the invention has been illustrated and described as embodied in a hydraulic braking arrangement for a towing vehicle with a trailer including a hydraulic accumulator on the trailer and providing a safety braking arrangement on the latter, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention.

What is claimed as new and desired to be protected by Letters Patent is set forth in the appended claims:

1. Hydraulic braking arrangement for a towing vehicle with a trailer comprising an operator controlled main brake cylinder on the towing vehicle; a second brake cylinder on said trailer; a source of hydraulic pressure fluid on said towing vehicle; conduit means connecting said source with said second brake cylinder; a brake valve on said towing vehicle arranged in said conduit means and constructed so that the fluid pressure exerted on said second brake cylinder is influenced in dependence on the pressure exerted by the operator on said main brake cylinder; a fluid coupling in said conduit means dividing the latter in a first section connected to the towing vehicle and a second section connected to said trailer; a hydraulic accumulator on said trailer; fluid passage means connecting said hydraulic accumulator with said second section of said conduit means; a one-way valve in said passage means permitting flow of fluid from said second section into said hydraulic accumulator while preventing flow of fluid in the opposite direction; a solenoid valve in said passage means including a magnet and a control member cooperating with said magnet for controlling flow of fluid between said fluid coupling and said second brake cylinder and between the latter and said hydraulic accumulator; and electric circuit including a current supply on said towing vehicle; an electrical connector connecting said circuit with said magnet of said solenoid valve; and at least one switch on said towing vehicle for opening and closing said circuit.

2. Hydraulic braking arrangement as defined in claim 1, and including biasing means for biasing said control member, when said magnet is deenergized, to a rest position in which said second brake cylinder is connected to said hydraulic accumulator, and wherein said magnet, when energized, moves said control member against the force of said biasing means to a working position in which flow of fluid between said hydraulic accumulator and said second brake cylinder is prevented and said second brake cylinder is connected to said fluid coupling.

3. Hydraulic braking arrangement as defined in claim 2, and including a fluid stream limiting valve in said fluid passage means, said limiting valve being connected in series to said one-way valve and is parallel to said control member.

4. Hydraulic braking arrangement as defined in claim 3, wherein said control member, said one-way valve, and said fluid stream limiting valve are arranged in a common housing.

5. Hydraulic braking arrangement as defined in claim 1, and including a second switch in said electric circuit, said second switch being constructed and arranged to be controlled dependent on the braking pressure acting on said second brake cylinder.

6. Hydraulic braking arrangement as defined in claim 5, wherein said second switch is constructed as a hydraulically operated differential pressure switch and including fluid passages connecting said second switch to said conduit means and to said main cylinder so that said second switch is operated by the difference of the braking pressure prevailing in said conduit means and on the pressure exerted by the operator on the main brake cylinder.

7. Hydraulic braking arrangement as define in claim 6, wherein said second switch includes a contact lever, at least one piston cooperating with said contact lever, a spring acting on said piston in the same direction as the pressure in said conduit means and biasing said piston to a first position in which said contact lever can assume a circuit closing position, the pressure acting on said main cylinder biasing said piston in the opposite direction to move said contact lever to a circuit opening position.

8. Hydraulic braking arrangement as defined in claim 7, and including a further spring connected to said contact lever and biasing the latter to said circuit closing position.

9. Hydraulic braking arrangement as defined in claim 7, and including a second piston cooperating with said contact lever and arranged opposite said one piston, and a spring biasing said second piston to a first position in which said contact lever can move to said circuit opening position and in which the pressure in said conduit means biases said second piston in the opposite direction to a second position in which said second piston moves said contact lever to said circuit closing position.

10. Hydraulic braking arrangement as defined in claim 7, wherein said second switch comprises a circuit closing contact engaged by said contact lever in said circuit closing position and a circuit opening contact engaged by said contact lever in said circuit opening position, and a time-delay element connected between said contacts for delaying opening of said circuit.

11. Hydraulic braking arrangement as defined in claim 1, wherein said towing vehicle includes an ignition switch coupled to said first switch to close the latter upon actuation of said ignition switch.

12. Hydraulic braking arrangement as defined in claim 1, wherein said towing vehicle includes a steering wheel, and wherein said first switch is a manually operated switch mounted in the region of said steering wheel.

13. Hydraulic braking arrangement as defined in claim 1, wherein said towing vehicle includes a brake pedal for applying pressure to said main cylinder, and including a third switch provided in said electrical circuit, and means on said brake pedal for opening said third switch upon movement of said brake pedal beyond its maximum permissible brake stroke.

14. Hydraulic braking arrangement as defined in claim 1, and including an electro-hydraulic pressure switch coordinated with said hydraulic accumulator, said pressure switch being arranged in a second electrical circuit connected to said first-mentioned electrical circuit, a control lamp on said towing vehicle and arranged in said second circuit, and a second connector in said second circuit between said towing vehicle and said trailer.

15. Hydraulic braking arrangement as defined in claim 1, and including a two-position valve in said passage means downstream of said solenoid valve for permitting, respectively preventing, flow of fluid between said solenoid valve and said hydraulic accumulator.

16. Hydraulic braking arrangement as defined in claim 15, and including a second hydraulic accumulator connected to said second brake cylinder, and a second two-position valve for permitting, respectively preventing, flow of fluid between said second hydraulic accumulator and said second brake cylinder.

17. Hydraulic braking arrangement as defined in claim 16, and including a piston in said second brake cylinder, brake means on said trailer, linkage means connected said brake means on said trailer with said piston, a spring in said second braking cylinder and biasing said piston to a brake releasing position, the pressure in said second accumulator being at most equal to the hydraulic pressure in said second braking cylinder which is produced by said spring.

18. Hydraulic braking arrangement as defined in claim 1, wherein said control member of said solenoid valve comprises at least one valve element cooperating with a valve seat in said solenoid valve for preventing, when said magnet is energized, flow of fluid from said hydraulic accumulator to said second brake cylinder.

19. Hydraulic braking arrangement as defined in claim 18, wherein said control member includes an additional valve element cooperating with a second valve seat in said solenoid valve and being separated from said one valve element and controlling flow of fluid through said second section of said conduit means to said second brake cylinder.

20. Hydraulic braking arrangement as defined in claim 19, wherein said solenoid valve includes a housing formed with an elongated bore, a first valve seat for said one element and a second valve seat for said additional valve element being respectively arranged in the regions of opposite ends of said bore, and including a spring biasing said additional valve element against its seat for preventing flow of fluid from said fluid coupling to said second brake cylinder, and wherein said solenoid valve includes a plunger, said one valve element being arranged between said plunger and said additional valve element.

21. Hydraulic braking arrangement as defined in claim 19, and including a fluid stream limiting valve in said second section, said housing having a first port connected to said hydraulic accumulator and a second port connected to said second brake cylinder and a passage in said housing between said ports, a throttle located in said passage arranged in series to said one valve element and in parallel to said fluid stream limiting valve.

22. Hydraulic braking arrangement for a towing vehicle as defined in claim 18, wherein said solenoid valve includes a housing formed with an elongated bore, a first port communicating with said bore and connected to said hydraulic accumulator, a second port communicating with said bore and connected to said second cylinder, and a third port connected to said fluid coupling and also communicating with said bore, said valve seat being provided in said bore, said control member being reciprocable in said bore and including a piston fixedly connected to said valve element and arranged to control flow of fluid between said second and said third port.

23. Hydraulic braking arrangement as defined in claim 1, wherein said source of pressure fluid is a pump and including an additional fluid operated device carried by said towing vehicle and a conduit connecting said device to said pump.

* * * * *